United States Patent
Vysotsky et al.

(10) Patent No.: US 10,911,310 B2
(45) Date of Patent: Feb. 2, 2021

(54) NETWORK TRAFFIC STEERING WITH PROGRAMMATICALLY GENERATED PROXY AUTO-CONFIGURATION FILES

(71) Applicant: Citrix Systems, Inc., Fort Lauderdale, FL (US)

(72) Inventors: Vladimir Vysotsky, Fremont, CA (US); Snigdhendu Mukhopadhyay, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/417,018

(22) Filed: May 20, 2019

(65) Prior Publication Data
US 2020/0374197 A1    Nov. 26, 2020

(51) Int. Cl.
| H04L 12/24 | (2006.01) |
| H04L 29/12 | (2006.01) |
| H04L 12/707 | (2013.01) |
| G06F 9/455 | (2018.01) |

(52) U.S. Cl.
CPC ...... *H04L 41/0886* (2013.01); *G06F 9/45558* (2013.01); *H04L 45/22* (2013.01); *H04L 61/1511* (2013.01); *H04L 61/6013* (2013.01); *G06F 2009/45595* (2013.01)

(58) Field of Classification Search
CPC . H04L 41/0886; H04L 45/22; H04L 61/1511; H04L 61/6013; G06F 9/45558; G06F 2009/45595
See application file for complete search history.

(56) References Cited

U.S. PATENT DOCUMENTS

| 8,166,141 | B1 | 4/2012 | Van Horne, III |
| 2004/0006615 | A1 | 1/2004 | Jackson |
| 2009/0254572 | A1* | 10/2009 | Redlich ............... G06Q 10/107 |
| 2011/0153721 | A1 | 6/2011 | Agarwal et al. |
| 2011/0231479 | A1 | 9/2011 | Boydstun et al. |
| 2014/0052838 | A1* | 2/2014 | Giacomoni ......... H04L 41/0893 709/223 |
| 2015/0033298 | A1 | 1/2015 | Martini |
| 2020/0028758 | A1* | 1/2020 | Tollet ..................... H04L 45/34 |

OTHER PUBLICATIONS

International Search Report and Written Opinion on International Appl. No. PCT/US2020/033582, dated Aug. 24, 2020.

* cited by examiner

*Primary Examiner* — Duc C Ho
(74) *Attorney, Agent, or Firm* — Foley & Lardner LLP

(57) ABSTRACT

Described embodiments provide systems and methods for steering network traffic using dynamically generated configuration scripts. A first device may generate a configuration script for an application on the client for connecting with a server. The configuration script may specify the application to establish a direct connection or an indirect connection with the server. The first device may provide the configuration script to be invoked by the application to identify a first address to access the server based on a determination to establish the direct connection or the indirect connection. The first device may receive, from the client, an initiation request to connect with the server including the first address. The first device may determine second address by applying a routing policy to the first address. The first device may establish one of the direct connection or the indirect connection using the second address.

20 Claims, 14 Drawing Sheets

NETWORK TRAFFIC STEERING WITH PROGRAMMATICALLY GENERATED PROXY AUTO-CONFIGURATION FILES

FIELD OF THE DISCLOSURE

The present application generally relates to network traffic steering. In particular, the present application relates to systems and methods for steering network traffic using dynamically generated configuration scripts.

BACKGROUND

In a networked environment, clients may access resources hosted on servers through proxy or intermediary devices. Properly routing network traffic between the clients and the servers through the intermediary devices may be challenging.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A client may communicate with a server through one or more intermediary devices in a networked environment (e.g., software-defined wide-area network (SD-WAN)) to access resources hosted on the server. The intermediary devices may steer or route network traffic exchange between the client and the server in accordance with a routing policy. The routing policy may be based on one or more criteria, such as: an application or modality classification of individual traffic flow based on a configurable taxonomy, identity and access rights of the user associated with the traffic flows, location and security characteristics of the source, intermediate, and destination networks, and current availability, quality of service, and usage level of network resources among the network locations. Some of these criteria may be manually configured by system administrators, while other criteria may be automated.

The network traffic may originate from applications running on the client (e.g., a web browser). Such applications may embed or reuse web browser networking functionality, and may support both direct connections to network servers (e.g., Hypertext Transfer Protocol (HTTP) or Hypertext Transfer Protocol Secure (HTTPS) servers) or indirect connections through one or more of the intermediary devices (sometimes herein referred to as proxy devices). The determination of whether to connect directly or use one of the intermediary devices can be automated using proxy auto-config (PAC) files provided to the client. A PAC file may be a script (e.g., a JavaScript program) deployed to the application and may be used by the application to determine an access method for a particular Uniform Resource Locator (URL). For example, the PAC file may specify direct connections for one set of URLs and an intermediary device for another set of URL for indirect connections. The access methods may be manually set by system administrator for a particular network.

Once deployed to client across the network, the applications may use the PAC files to access resources references by various URLs. But steering destination addresses (or targets) for individual network flows may not correspond to the destination addresses used by the applications. The improper steering may be due to multiple reasons. First, the applications may not be configured to use the correct PAC files. Second, the information on the PAC files may become obsolete or out-of-date, leading to improper determination of access methods in retrieving resources via various URLs. Third, dynamic traffic steering criteria on the intermediary devices may not be taken into account when configuring the PAC files. Fourth, the PAC file may be incorrectly programmed, due to human error or organizational errors in the network administration process. These technical issues may exist in enterprise networking configurations with a centralized proxy or gateway through network traffic enters and leaves. But problems relating to improper steering due to misconfigured or obsolete PAC files may be exacerbated in complex network environments, such as in cloud computing systems. In such complex network environments, network traffic may be at least partially offloaded from centralized proxies and directly onto servers to minimize network latency and to enable higher quality user experience.

One approach to address some of the problems originating from such PAC files may include using an automated Application Programming Interface (API) to publish the list of domain names and Internet Protocol (IP) addresses referencing network endpoints for various services. Each time the list of domain names and IP addresses are published via the API, the PAC files may be updated. As the publication of new lists may happen as often as daily, it may be impracticable to have the system administrator manually update the PAC files. Instead, a protocol proxy service on one of the intermediary devices (e.g., a SD-WAN instance) may be used to update the PAC files to use the proxy service for all network connections. Such an implementation may provide the intermediary device flexibility for steering the traffic originated by the applications running on the clients. For each network connection handled by a built-in protocol proxy, the intermediary device may make an individual decision on whether to connect directly to the target server or to send the connection through an upstream proxy.

However, this approach may present a major efficiency challenge for the intermediary device. To achieve maximum performance, such implementations may be implemented as Layer 3 (network layer) entities in the Open Systems Interconnection (OSI) model, and maintain fairly lightweight state for each network data flow. Protocol proxies, on the other hand, may be implemented as Layer 4 (transport) to Layer 7 (application layer) entities that consume considerably more resources for stateful network flow processing. Thus, the addition of protocol proxy functionality may result in the drastic increase of resource requirements and configurations. Such an implementation may also lead to reduction maximum achievable throughput if additional resources (e.g., memory and CPU cycles) are not available.

To address these and other technical challenges in steering network traffic through intermediary devices, a portion of the proxy-specific traffic path selection logic may be implemented on the application via a configuration script. To this end, the intermediary device may dynamically generate the configuration script for traffic destination decision-making based on various policies and dynamic criteria. The generated script may be deployed as a PAC file to applications in the networks for which the intermediary device provides connectivity for the clients. The functionality of the configuration script may be further enhanced using indirection (e.g., proxy aliases with dynamic network address translation (NAT)) or bi-directional remote procedure call (RPC) via a domain name system (DNS).

Upon deployment of the configuration script, the application running on the client may select the proxy to which to direct network traffic. With proxy selection performed on the application of the client, the traffic steering on the intermediary device itself may be performed in a lightweight manner using Layer 3 functionality. The intermediary device may classify the connection made by the application relative to the taxonomy for the application based on the destination address and port in the first packet of the connection (e.g., a Transmission Control Protocol (TCP) with a synchronization (SYN) message or equivalent under User Datagram Protocol (UDP)). Following the classification, the intermediary device may determine a target destination and a network path for the flow. Once determined, the intermediary device ay automatically apply the determined target destination and network path to subsequent packets, without inspecting the remainder of the flow and without maintaining a per-flow state. The intermediary device may also implement firewall rules and may perform detection and handling of non-compliant applications.

In one aspect, the present disclosure is directed to a method of steering network traffic using dynamically generated configuration scripts. A first device intermediary between a client and a second device may generate a configuration script for an application executing on the client for connecting the client with a server. The configuration script may specify the application to establish one of a direct connection with the server via the first device or an indirect connection with the server via the first device and the second device responsive to an access request to access resources on the server. The first device may provide, to the client, the configuration script to be invoked by the application executing on the client to identify a first address to access the resources on the server based on a determination to establish one of the direct connection or the indirect connection with the server responsive to the access request. The first device may receive, from the client, an initiation request to connect with the server. The initiation request may include the first address identified by the application in accordance with the configuration script. The first device may determine second address to connect with the server by applying a routing policy to the first address included in the initiation request received from the client. The routing policy may be used to modify addresses for accessing the resources on the server. The first device may establish one of the direct connection or the indirect connection between the client and the server using the second address determined by applying the routing policy to the first address included in the initiation request. The established direct connection or the indirect connection may be used to steer traffic between the client and the server.

In some embodiments, the first address may include an alias address for a plurality of second devices intermediary between the first device and the server to access the resources on the server. In some embodiments, determining the second address may include selecting the second device from a plurality of second devices intermediary between the first device and the server by applying the routing policy to the alias address. The routing policy may be used to select of one of the plurality of second devices for the alias address based on network path criteria. In some embodiments, determining the second address may include identifying the second address referencing the second device selected from the plurality of second devices by applying the routing policy.

In some embodiments, the first address may include an alias address. The alias address may include a first substring and a second substring. The first substring of the alias address may correspond a plurality of second devices intermediary between the first device and the server to access the resources on the server. The second substring of the alias address may identify service parameters to connect with the server. In some embodiments, determining the second address may include identifying the service parameters from the first substring included in the alias address of the initiation request. In some embodiments, determining the second address may include selecting the second device from the plurality of second devices by applying the routing policy to the second substring of the alias address. The routing policy may be used to select of one of the plurality of second devices based on the service parameters identified from the first substring of the alias address. In some embodiments, determining the second address may include identifying the second address referencing the second device selected from the plurality of second devices by applying the routing policy.

In some embodiments, the first device may receive, from the client, a domain name system (DNS) query encoded by the application in accordance with the configuration script. The DNS query may include a service address for the server. In some embodiments, the first device may determine to establish one of the direct connection or the indirect connection by applying the routing policy to the service address. In some embodiments, the first device may select the first address from a plurality of network addresses based on the determination of establishing one of the direct connection or the indirect connection. The plurality of addresses may include a first network address to establish the direct connection and a second network address to the indirect connection. In some embodiments, the first device may provide, to the client, a DNS response including the first address to establish one of the direct connection or the indirect connection between the client and the server. In some embodiments, determining the second address may include using the first address as the second address to connect with the server in accordance with the routing policy.

In some embodiments, the first device may receive, from the client, a domain name system (DNS) query generated by the application in accordance with the configuration script. The DNS query may include a service address for the server. In some embodiments, the first device may determine to establish the direct connection between the client and the server via the first device by applying the routing policy to the hostname in the DNS query. In some embodiments, the first device may provide, to the client, a DNS response with an indication to establish the direct connection to cause the application to initiate the direct connection by sending the initiation request including the first address specified by the configuration script for the direct connection with the server.

In some embodiments, the first device may receive, from the client, a domain name system (DNS) query generated by the application in accordance with the configuration script. The DNS query may include a service address for the server. In some embodiments, the first device may determine to establish the indirect connection between the client and the server via the first device by applying the routing policy to the hostname in the DNS query. In some embodiments, the first device may provide, to the client, a DNS response with an indication to establish the indirect connection to cause the application to initiate the indirect connection by sending the initiation request including the first address specified by the configuration script for the indirect connection with the server via the second device.

In some embodiments, the first device may receive, from the client, a domain name system (DNS) query encoded by the application in accordance with the configuration script. The DNS query may include a service address having an encoded hostname corresponding to the server. In some embodiments, the first device may find a plurality of candidate network addresses from which to determine the first address for the server using the encoded hostname from the DNS query.

In some embodiments, the configuration script may include a first proxy autoconfig (PAC) file. In some embodiments, the first device may generate, subsequent to generating the first PAC file, a second PAC file, the second PAC file specifying the application whether to establish the direct connection or the indirect connection with the server. In some embodiments, the first device may provide, to the client, the second PAC file to generate a third address to access the resources on the server on a second determination of whether to establish the direct connection or the indirect connection with the server responsive to a second access request. The third address may be different from the first address.

In some embodiments, the first device may identify a pre-generated configuration script from an external source. The pre-generated configuration script may include a plurality of routing actions. Each routing action may specify one of the direct connection or the indirect connection. In some embodiments, the first device may generate, for a script generation policy, a plurality of templates using the pre-generated configuration script, each template corresponding to one of the plurality of routing actions. In some embodiments, generating the configuration script may include generating the configuration script by selecting a template from the plurality of templates in accordance to the script generation policy based on at least one of an application profile for the application executing on the client, an account profile of a user on the application, and a network profile of the client. In some embodiments, the configuration script generated for the client may differ from a second configuration script generated for a second client.

In another aspect, the present disclosure is directed to a system for steering network traffic using dynamically generated configuration scripts. The system may include a first device having one or more processors intermediary between a client and a second device. The first device may generate a configuration script for an application executing on the client for connecting the client with a server. The configuration script may specify the application to establish one of a direct connection with the server via the first device or an indirect connection with the server via the first device and the second device responsive to an access request to access resources on the server. The first device may provide, to the client, the configuration script to be invoked by the application executing on the client to identify a first address to access the resources on the server based on a determination to establish one of the direct connection or the indirect connection with the server responsive to the access request. The first device may receive, from the client, an initiation request to connect with the server. The initiation request may include the first address identified by the application in accordance with the configuration script. The first device may determine second address to connect with the server by applying a routing policy to the first address included in the initiation request received from the client. The routing policy may be used to modify addresses for accessing the resources on the server. The first device may establish one of the direct connection or the indirect connection between the client and the server using the second address determined by applying the routing policy to the first address included in the initiation request. The established direct connection or the indirect connection may be used to steer traffic between the client and the server.

In some embodiments, the first address may include an alias address for a plurality of second devices intermediary between the first device and the server to access the resources on the server. In some embodiments, the first device may select the second device from a plurality of second devices intermediary between the first device and the server by applying the routing policy to the alias address. The routing policy may be used to select of one of the plurality of second devices for the alias address based on network path criteria. In some embodiments, the first device may identify the second address referencing the second device selected from the plurality of second devices by applying the routing policy.

In some embodiments, the first address may include an alias address. The alias address may include a first substring and a second substring. The first substring of the alias address may correspond a plurality of second devices intermediary between the first device and the server to access the resources on the server. The second substring of the alias address may identify service parameters to connect with the server. In some embodiments, the first device may identify the service parameters from the first substring included in the alias address of the initiation request. In some embodiments, the first device may select the second device from the plurality of second devices by applying the routing policy to the second substring of the alias address. The routing policy may be used to select of one of the plurality of second devices based on the service parameters identified from the first substring of the alias address. In some embodiments, the first device may identify the second address referencing the second device selected from the plurality of second devices by applying the routing policy.

In some embodiments, the first device may receive, from the client, a domain name system (DNS) query encoded by the application in accordance with the configuration script. The DNS query may include a service address for the server. In some embodiments, the first device may determine to establish one of the direct connection or the indirect connection by applying the routing policy to the service address. In some embodiments, the first device may select the first address from a plurality of network addresses based on the determination of establishing one of the direct connection or the indirect connection. In some embodiments, the first device may provide, to the client, a DNS response including the first address to establish one of the direct connection or the indirect connection between the client and the server. In some embodiments, the first device may use the first address as the second address to connect with the server in accordance with the routing policy.

In some embodiments, the first device may receive, from the client, a domain name system (DNS) query generated by the application in accordance with the configuration script. The DNS query may include a service address for the server. In some embodiments, the first device may determine to establish the direct connection between the client and the server via the first device by applying the routing policy to the hostname in the DNS query. In some embodiments, the first device may provide, to the client, a DNS response with an indication to establish the direct connection to cause the application to initiate the direct connection by sending the initiation request including the first address specified by the configuration script for the direct connection with the server.

In some embodiments, the first device may receive, from the client, a domain name system (DNS) query generated by the application in accordance with the configuration script. The DNS query may include a service address for the server. In some embodiments, the first device may determine to establish the indirect connection between the client and the server via the first device by applying the routing policy to the hostname in the DNS query. In some embodiments, the first device may provide, to the client, a DNS response with an indication to establish the indirect connection to cause the application to initiate the indirect connection by sending the initiation request including the first address specified by the configuration script for the indirect connection with the server via the second device.

In some embodiments, the first device may receive, from the client, a domain name system (DNS) query encoded by the application in accordance with the configuration script. The DNS query may include a service address having an encoded hostname corresponding to the server. In some embodiments, the first device may find a plurality of candidate network addresses from which to determine the first address for the server using the encoded hostname from the DNS query.

In some embodiments, the configuration script may include a first proxy autoconfig (PAC) file. In some embodiments, the first device may generate, subsequent to generating the first PAC file, a second PAC file, the second PAC file specifying the application whether to establish the direct connection or the indirect connection with the server. In some embodiments, the first device may provide, to the client, the second PAC file to generate a third address to access the resources on the server on a second determination of whether to establish the direct connection or the indirect connection with the server responsive to a second access request. The third address may be different from the first address.

In some embodiments, the first device may identify a pre-generated configuration script from an external source. The pre-generated configuration script may include a plurality of routing actions. Each routing action may specify one of the direct connection or the indirect connection. In some embodiments, the first device may generate, for a script generation policy, a plurality of templates using the pre-generated configuration script, each template corresponding to one of the plurality of routing actions. In some embodiments, the first device may generate the configuration script based on at least one of an application profile for the application executing on the client, an account profile of a user on the application, and a network profile of the client. In some embodiments, the configuration script generated for the client may differ from a second configuration script generated for a second client.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
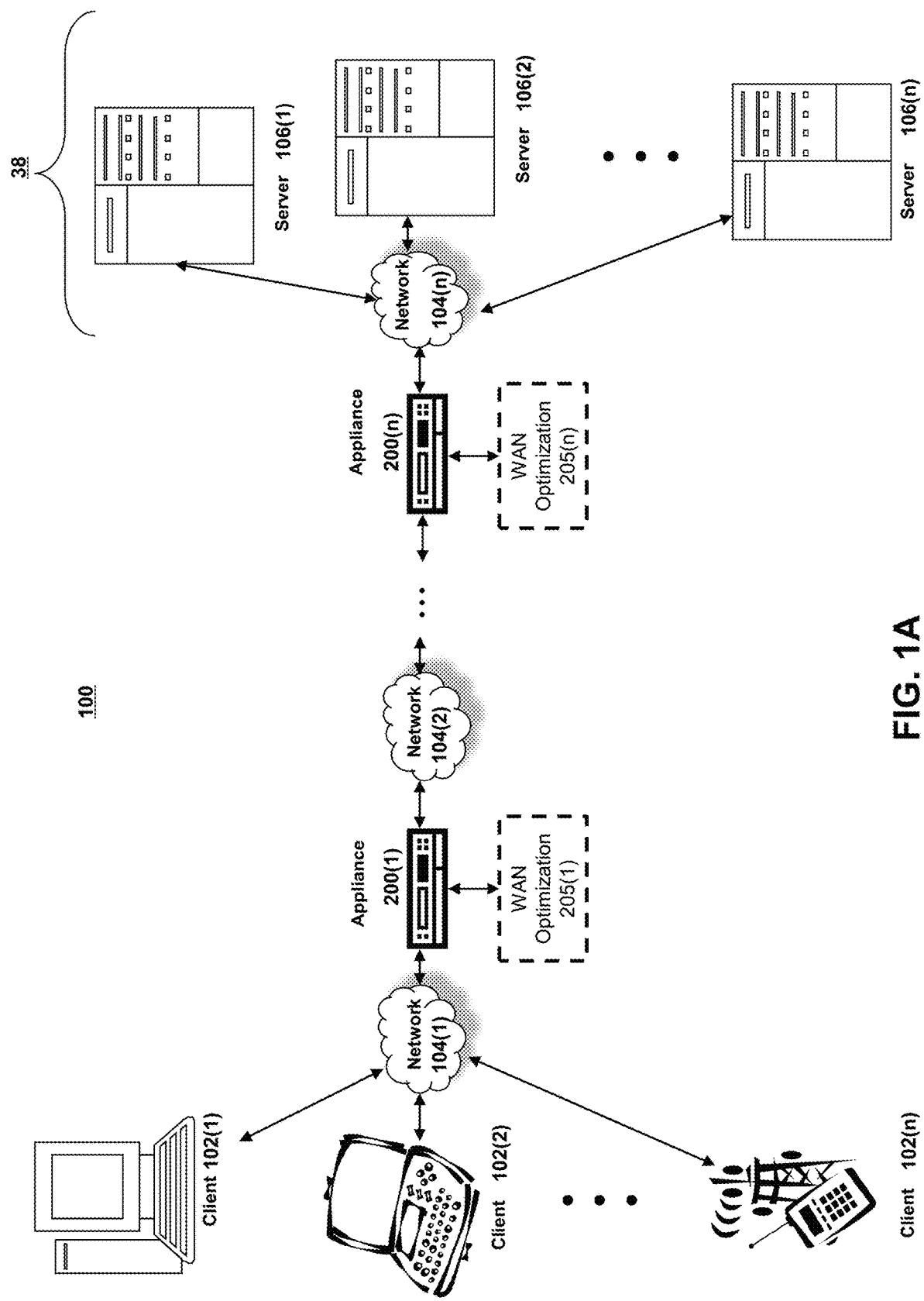
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for steering network traffic using dynamically generated configuration scripts.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
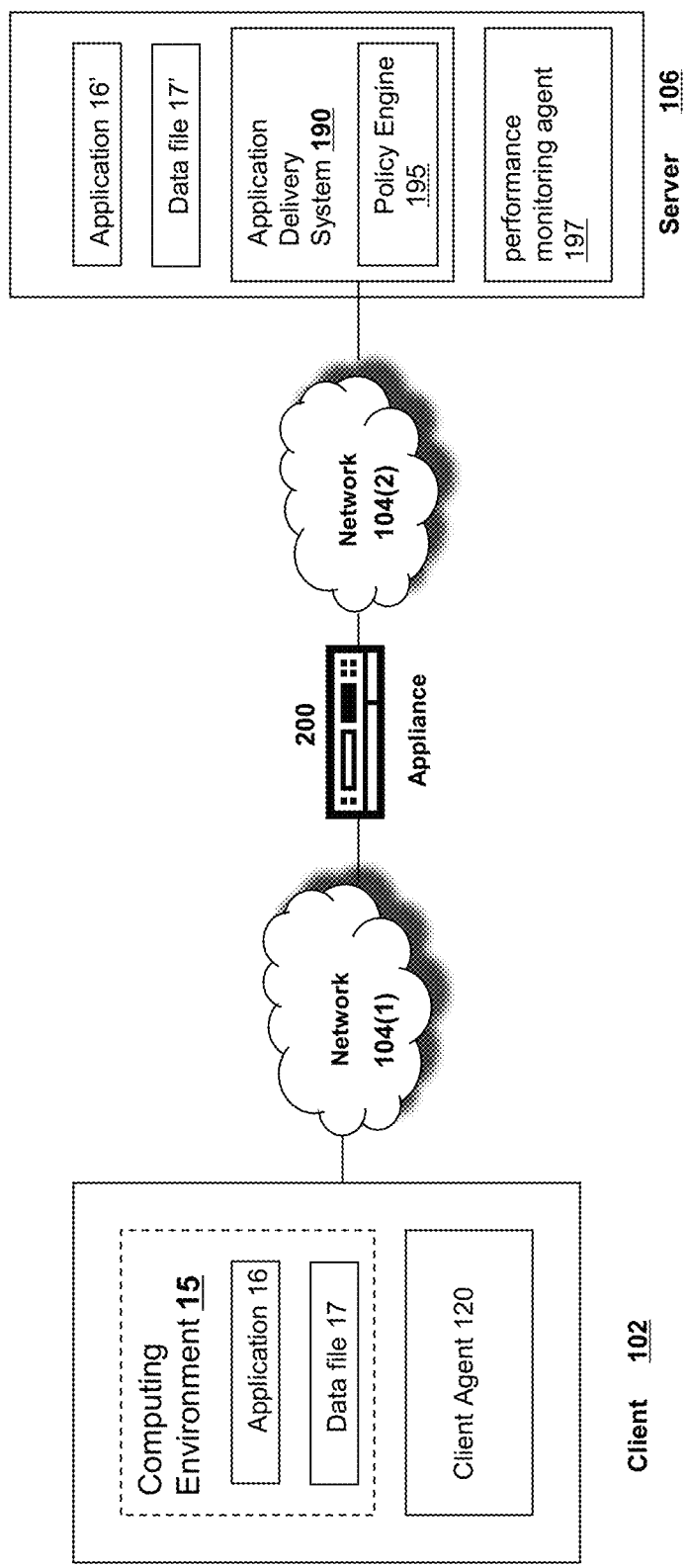
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
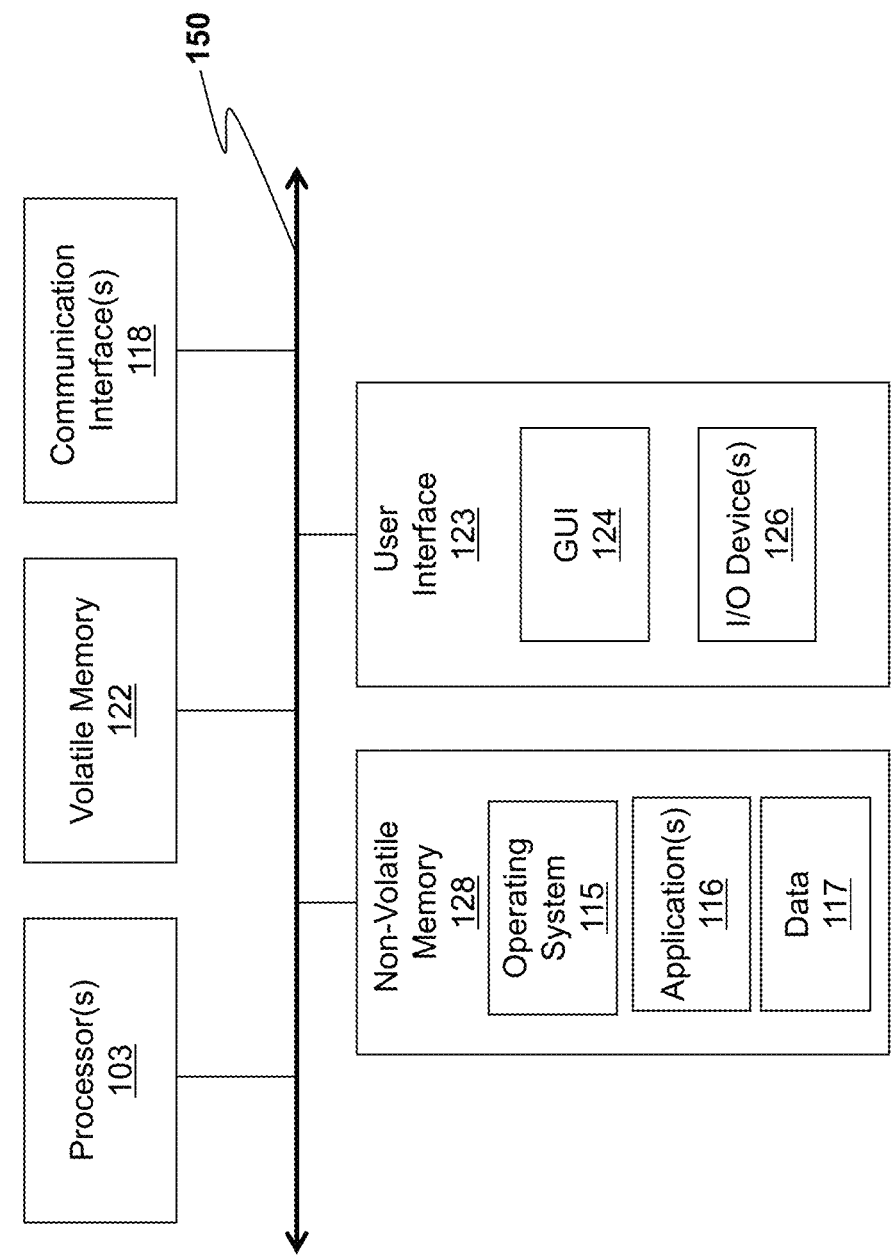
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
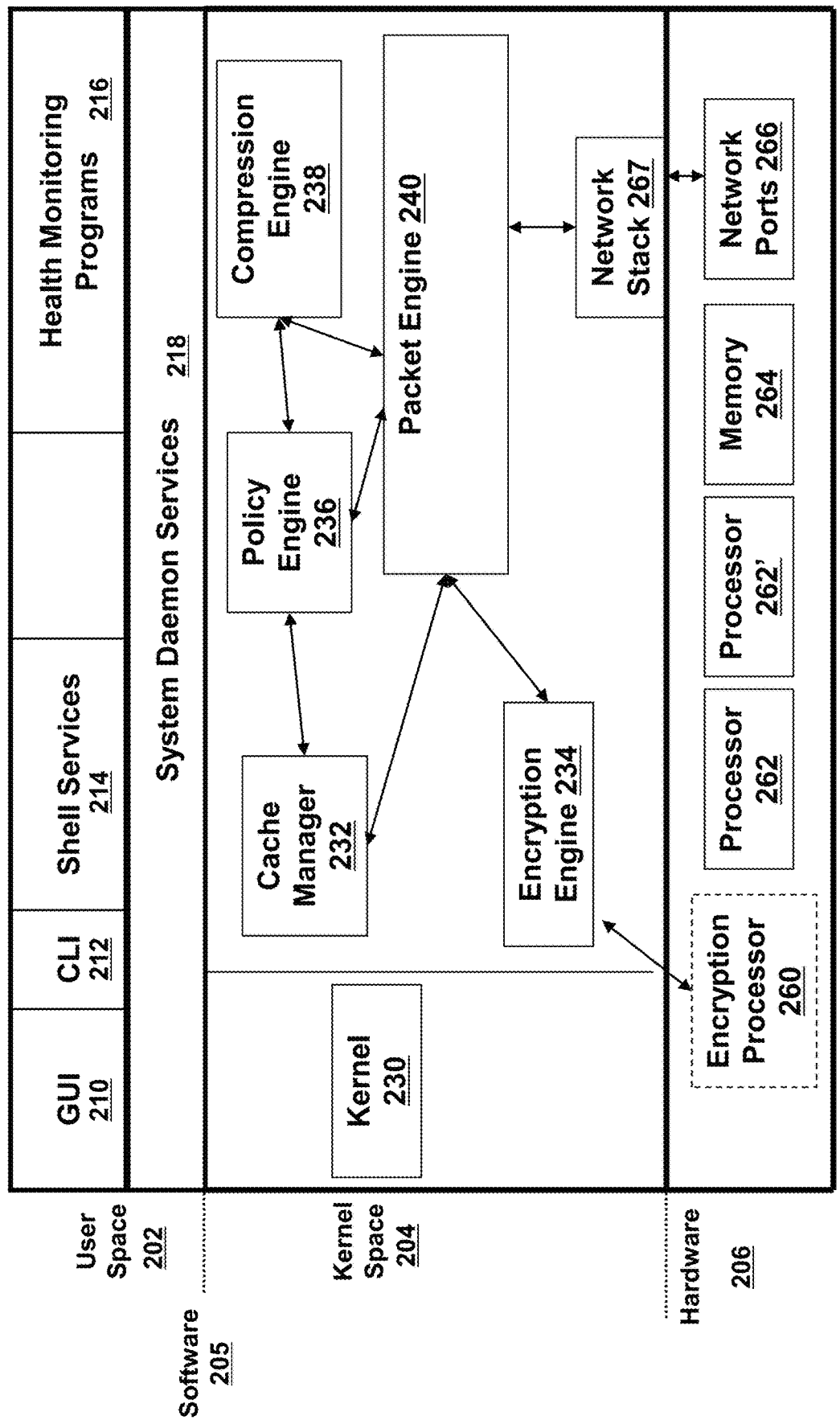
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104.

Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
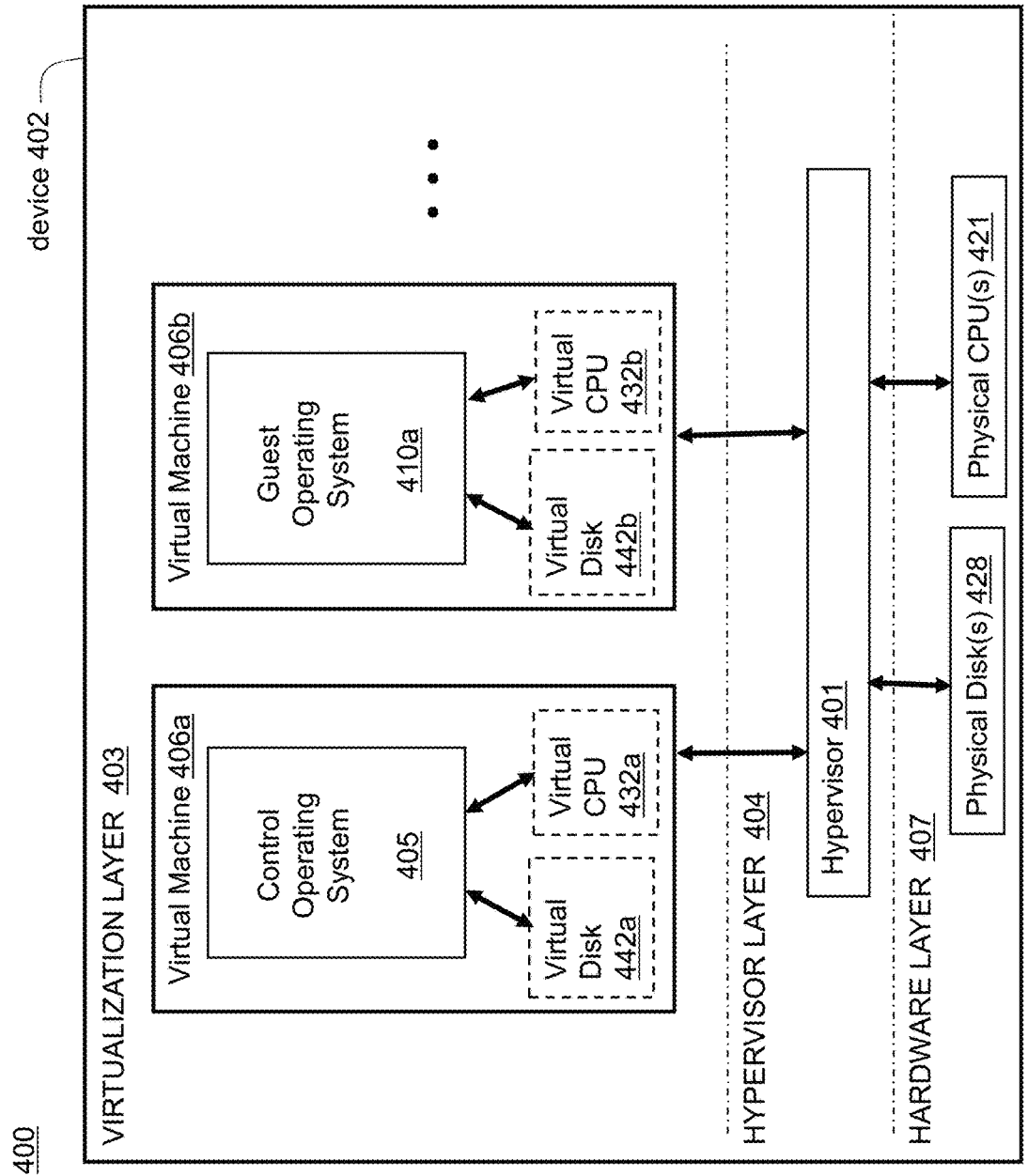
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
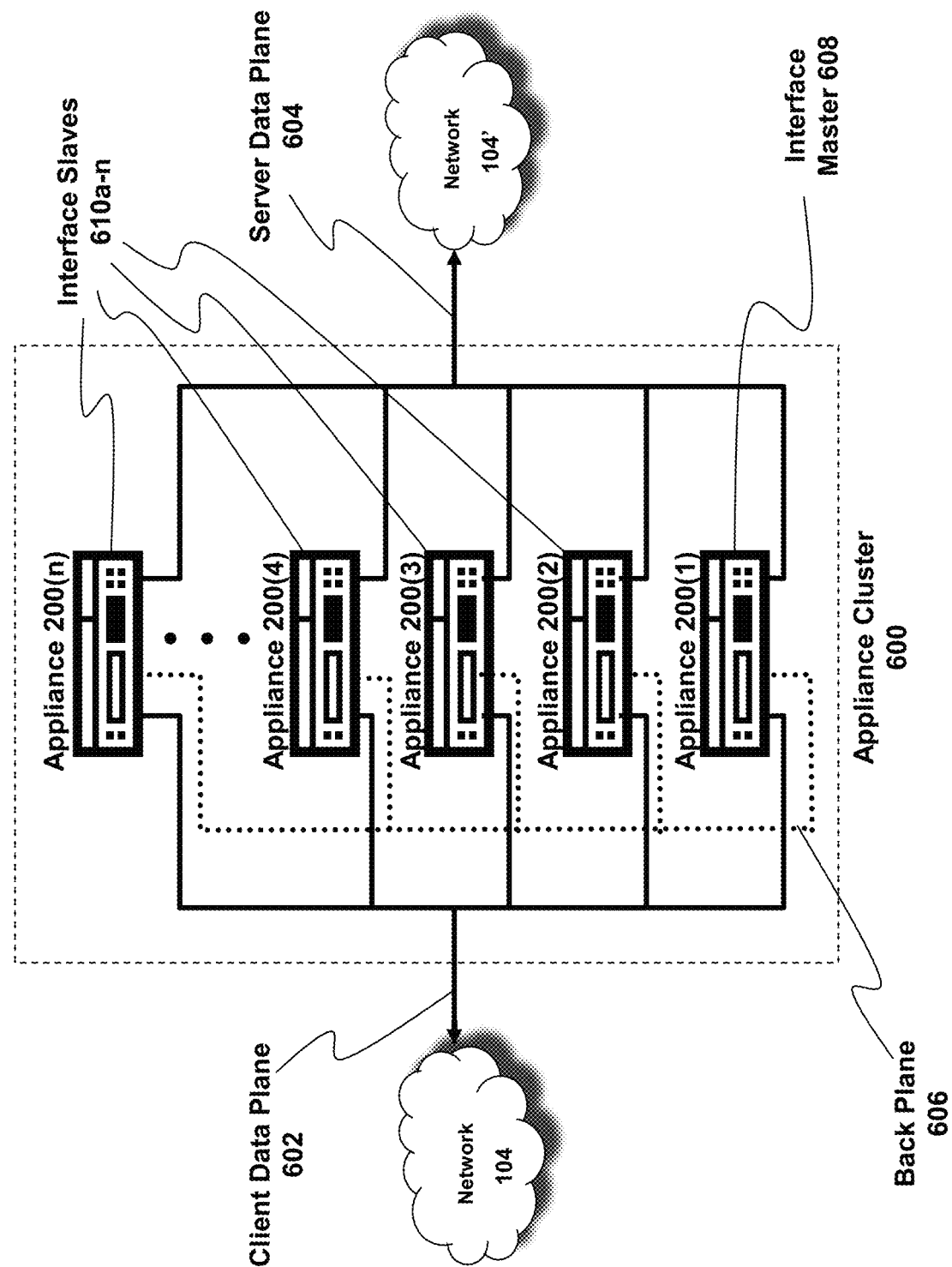
FIG. 4 is a block diagram of a cluster system, in accordance with an illustrative embodiment.
Figure 5:
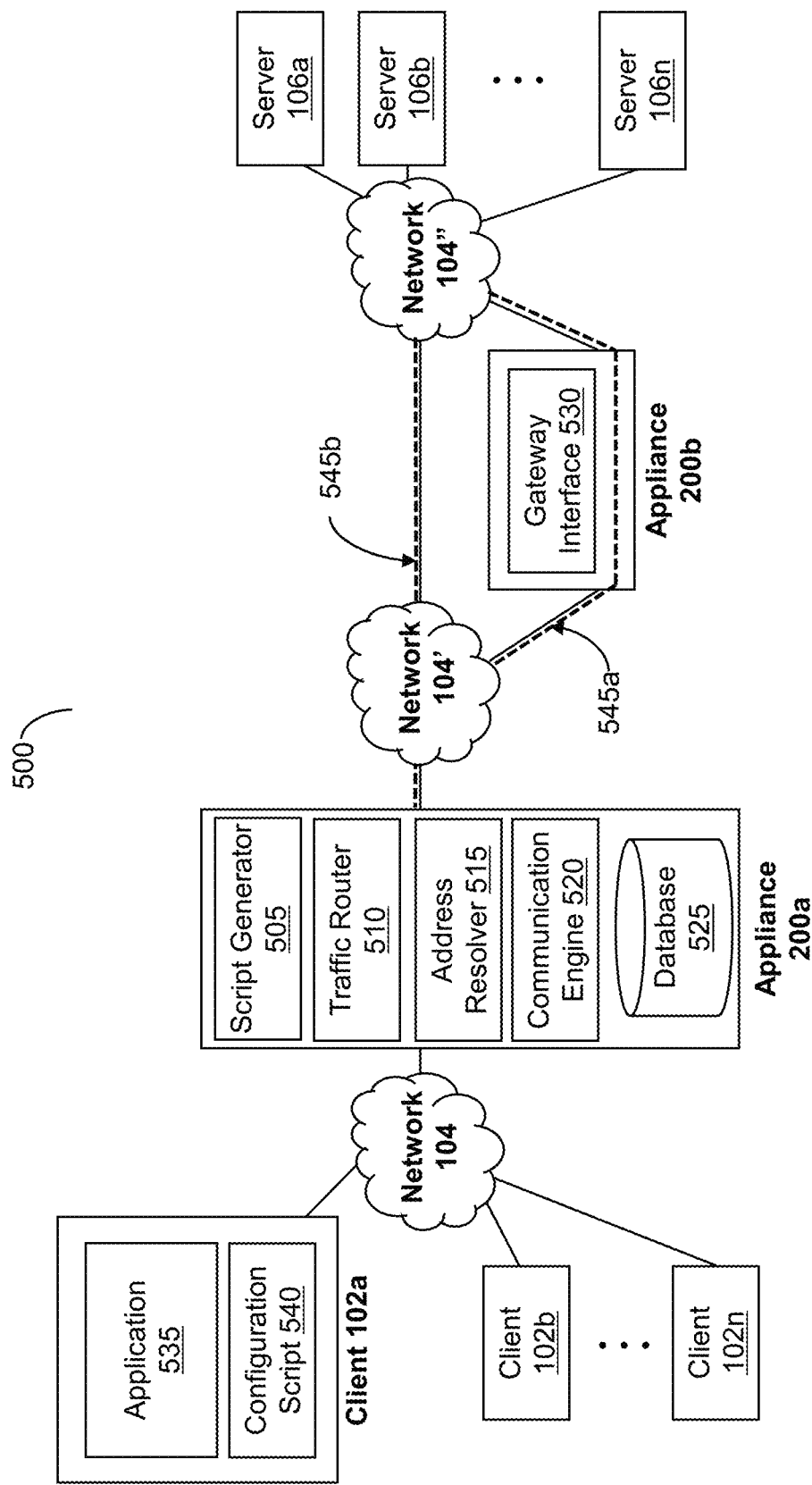
FIG. 5 is a block diagram of an embodiment of a system for steering network traffic using dynamically generated configuration scripts.
Figure 6:
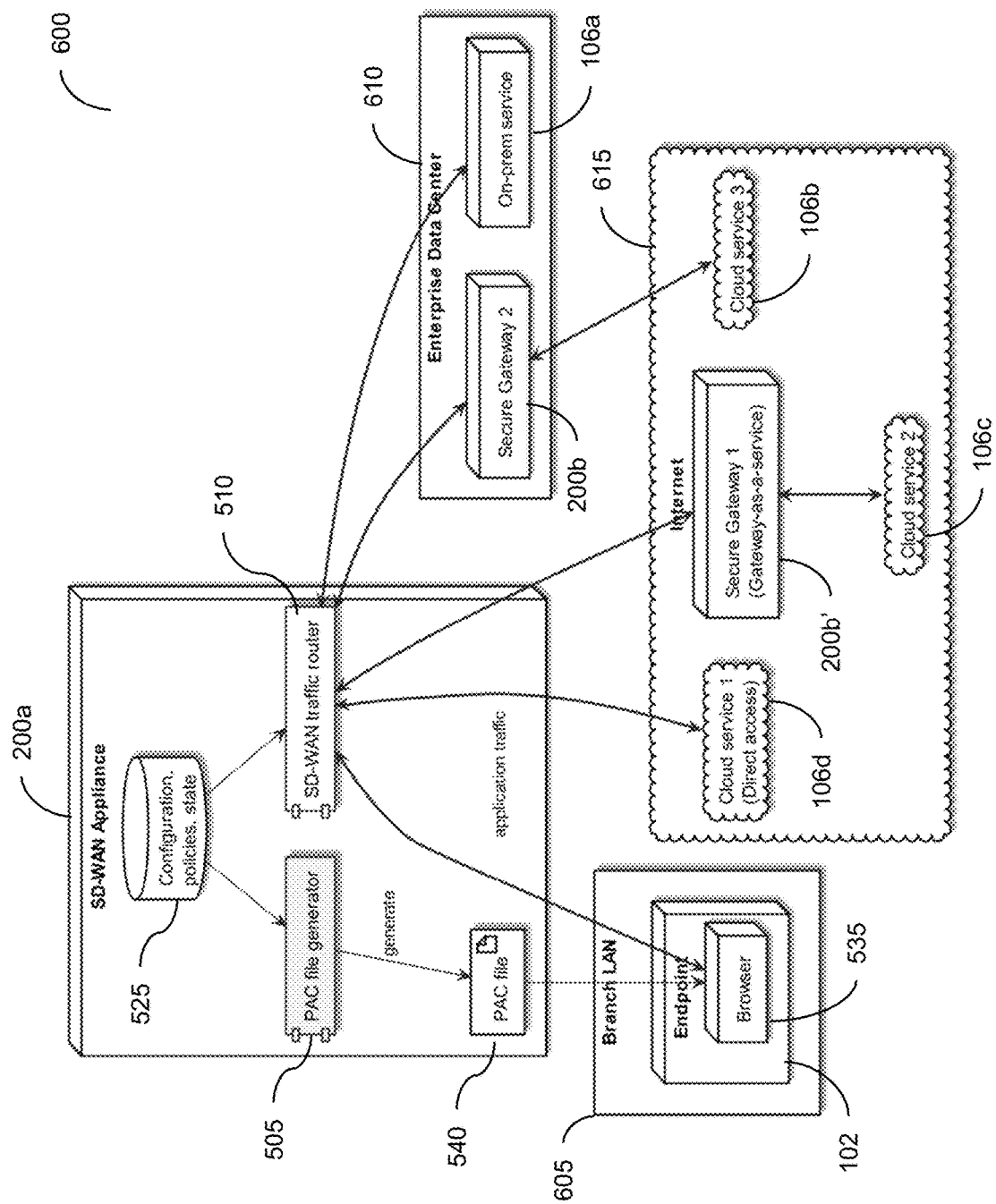
FIG. 6 is a component diagram of an embodiment of a system for system for steering network traffic using dynamically generated configuration scripts in a use case environment.
Figure 7A:
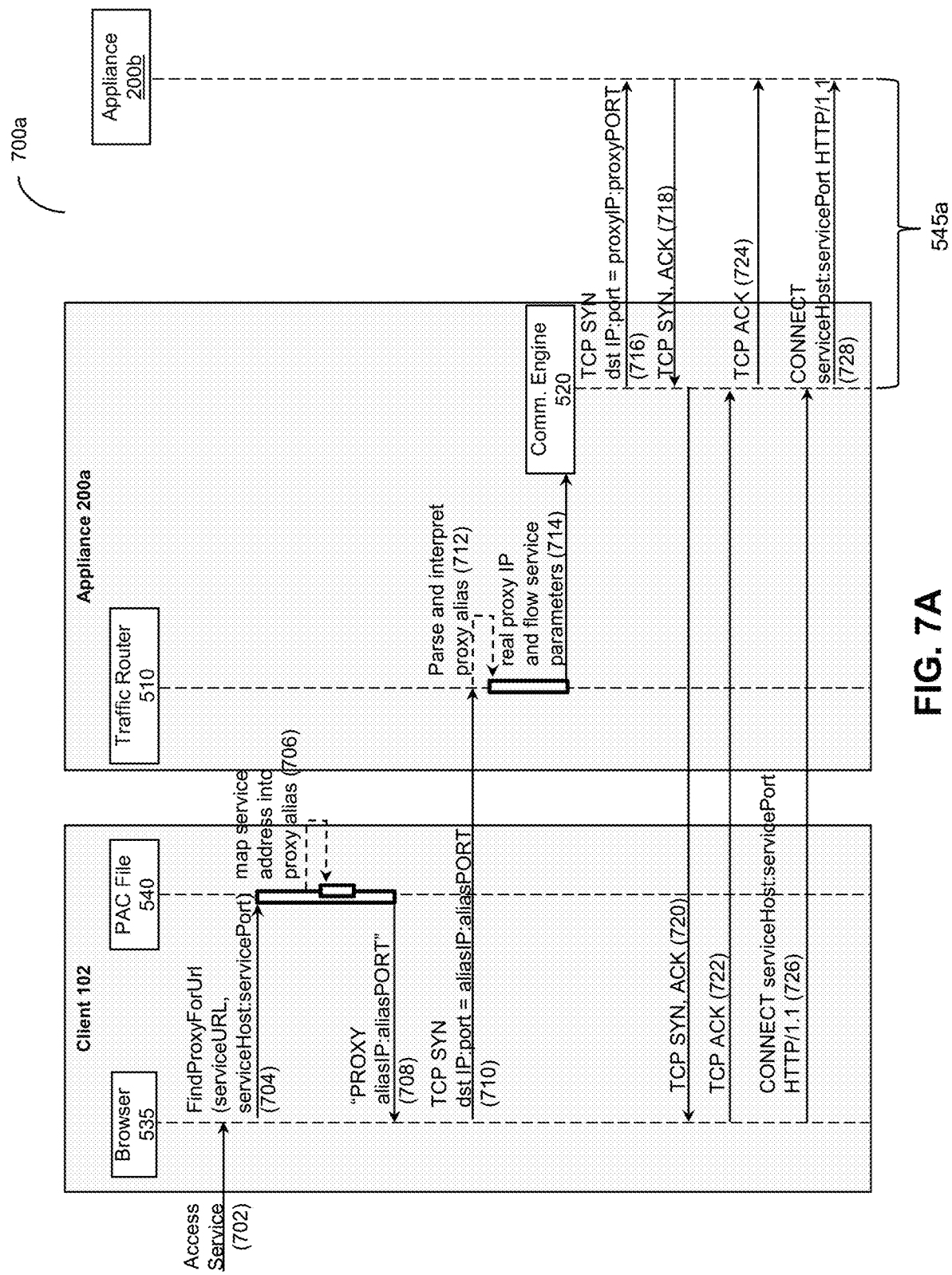
FIG. 7A-7C are sequence diagrams of an embodiment of a process for steering network traffic using dynamically generated configuration scripts.
Figure 7B:
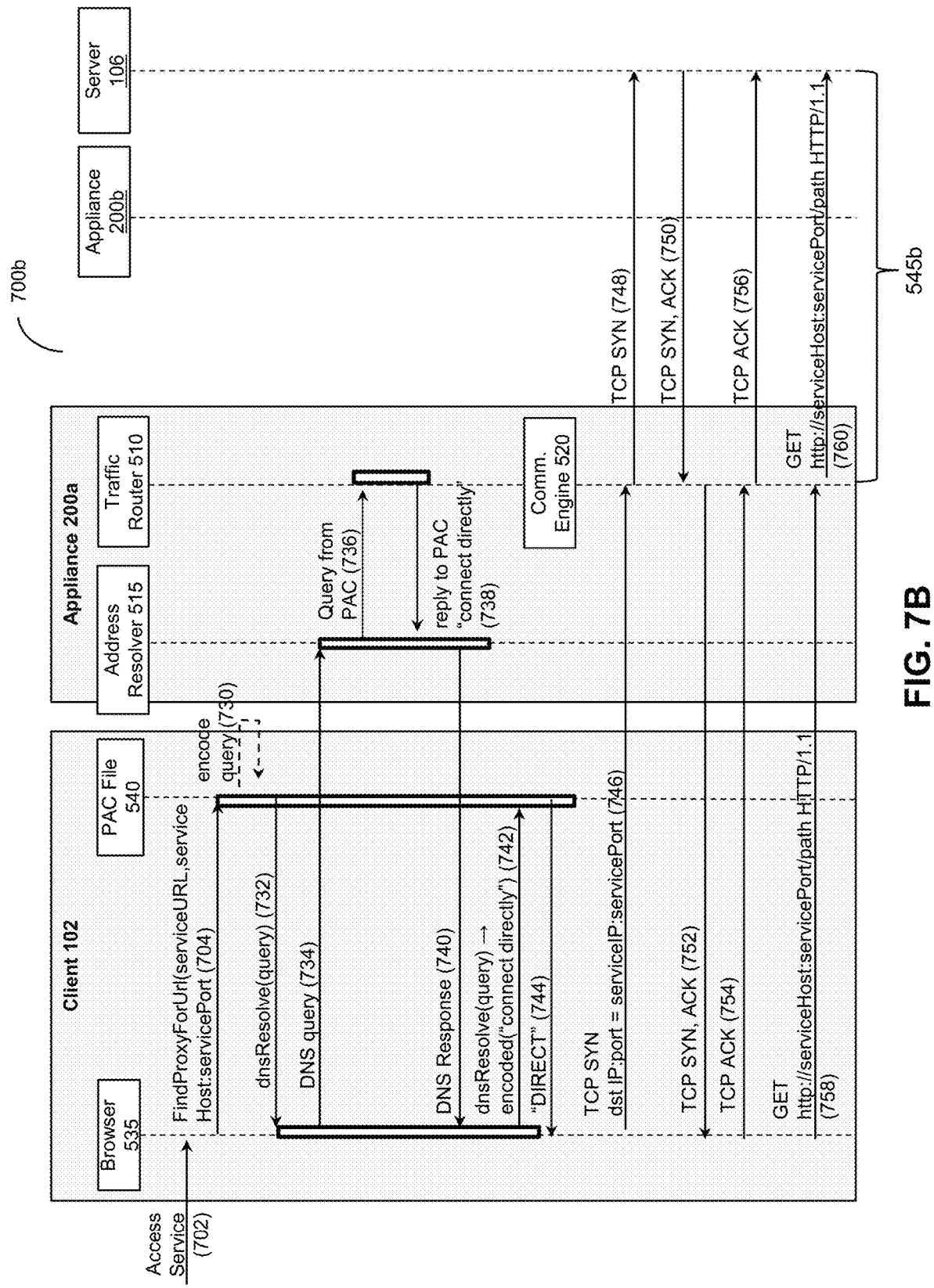
Figure 7C:
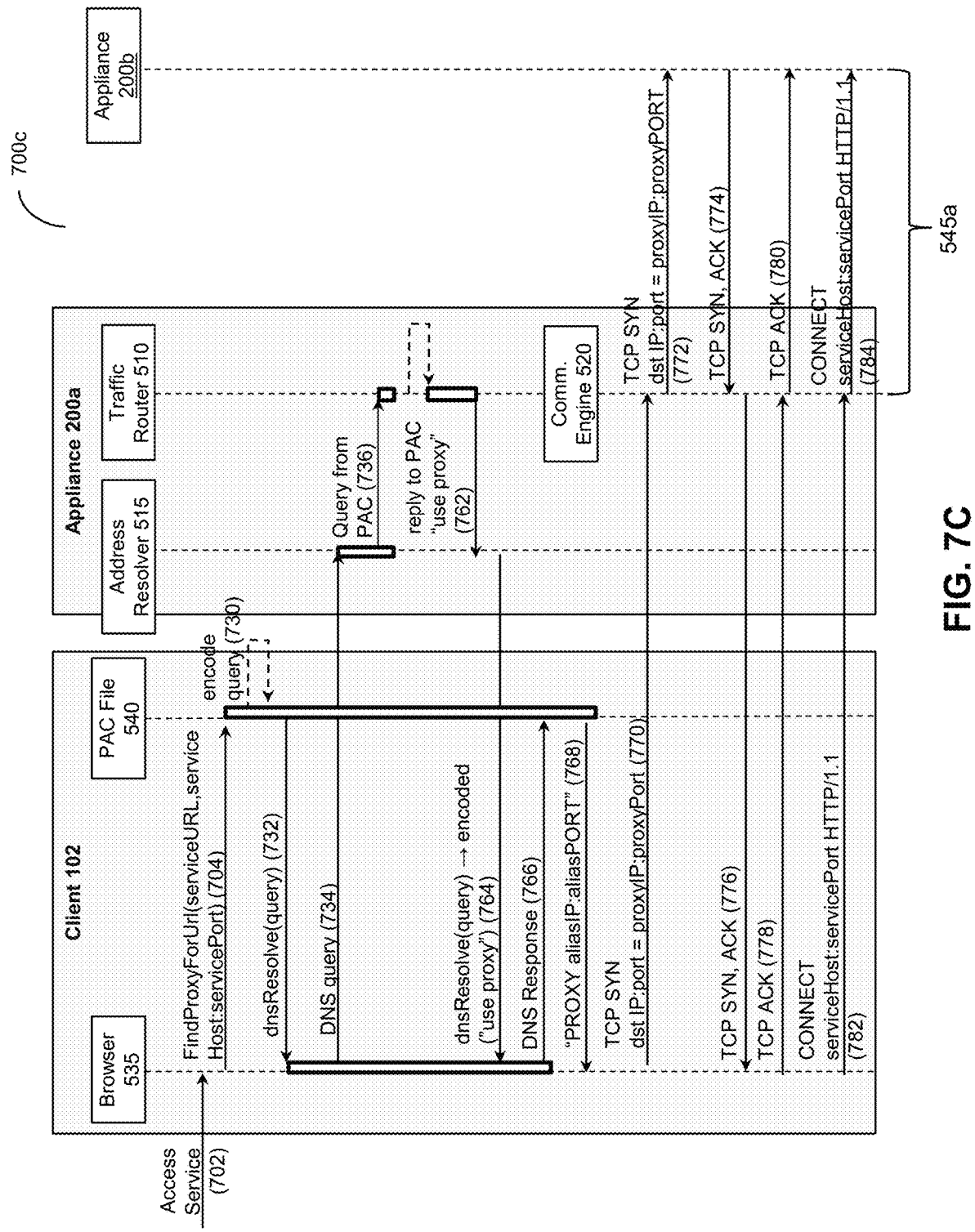
Figure 8A:
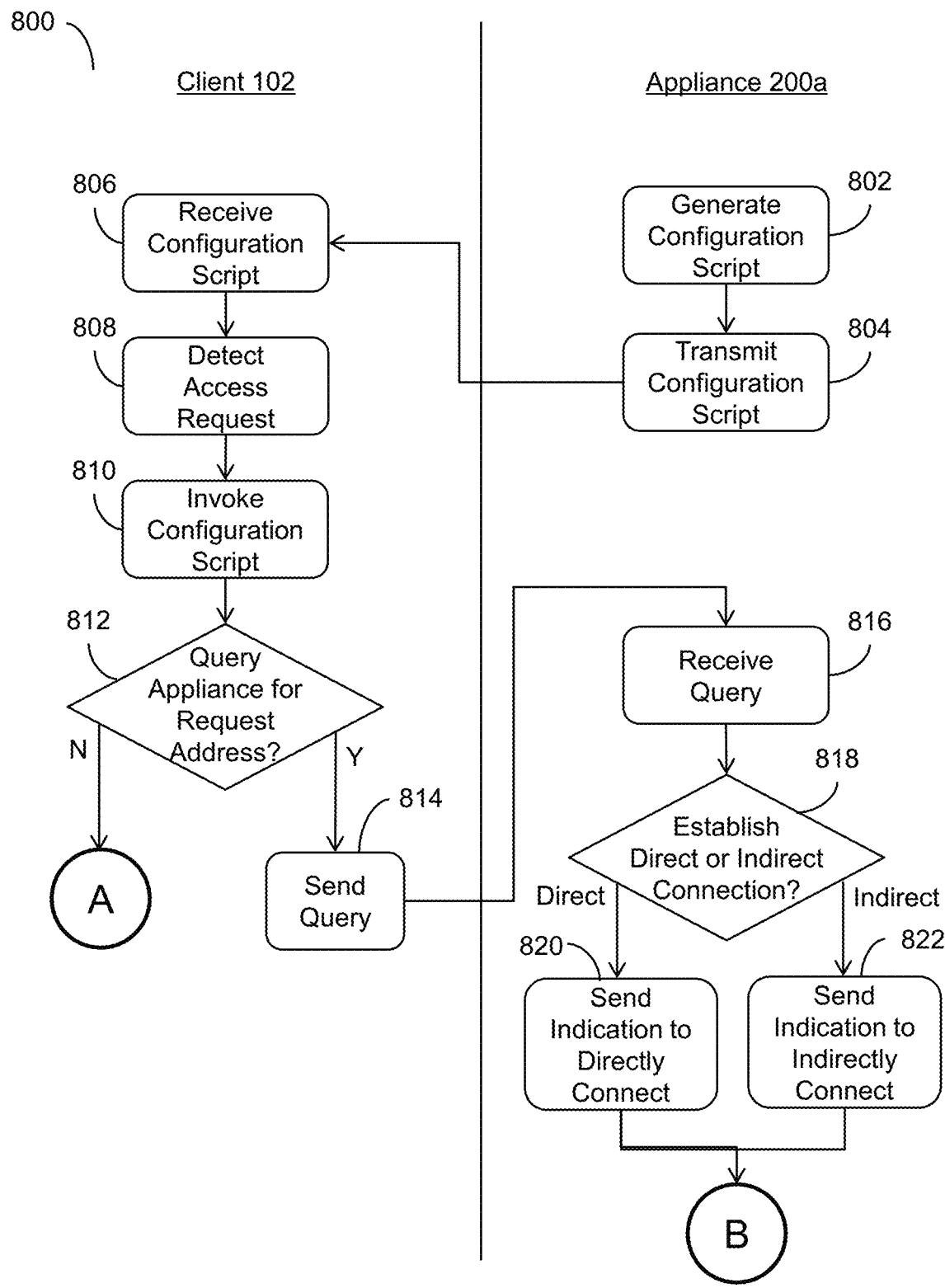
FIG. 8A-8C are flow diagrams of an embodiment of a method of steering network traffic using dynamically generated configuration scripts.
Figure 8B:
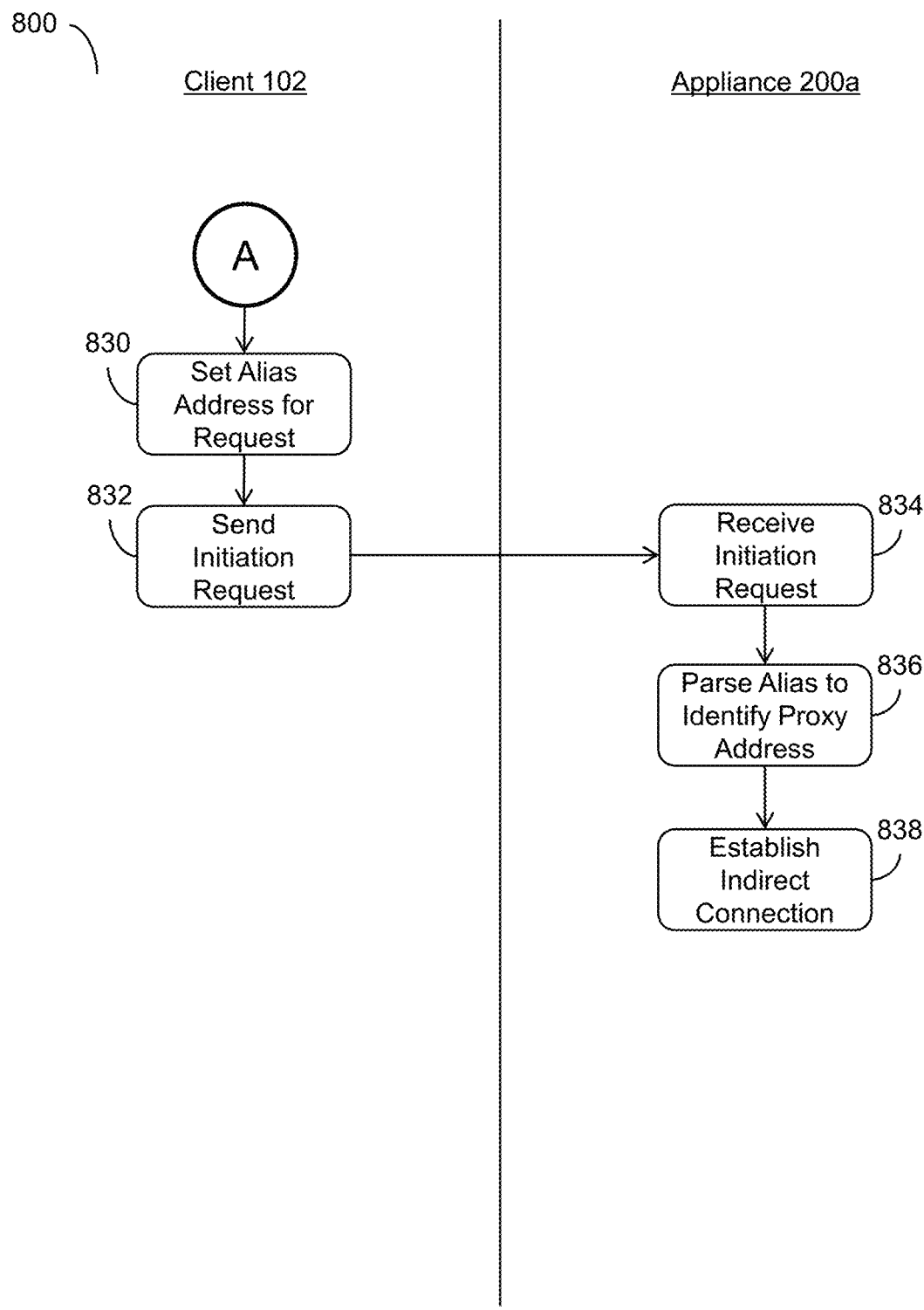
Figure 8C:
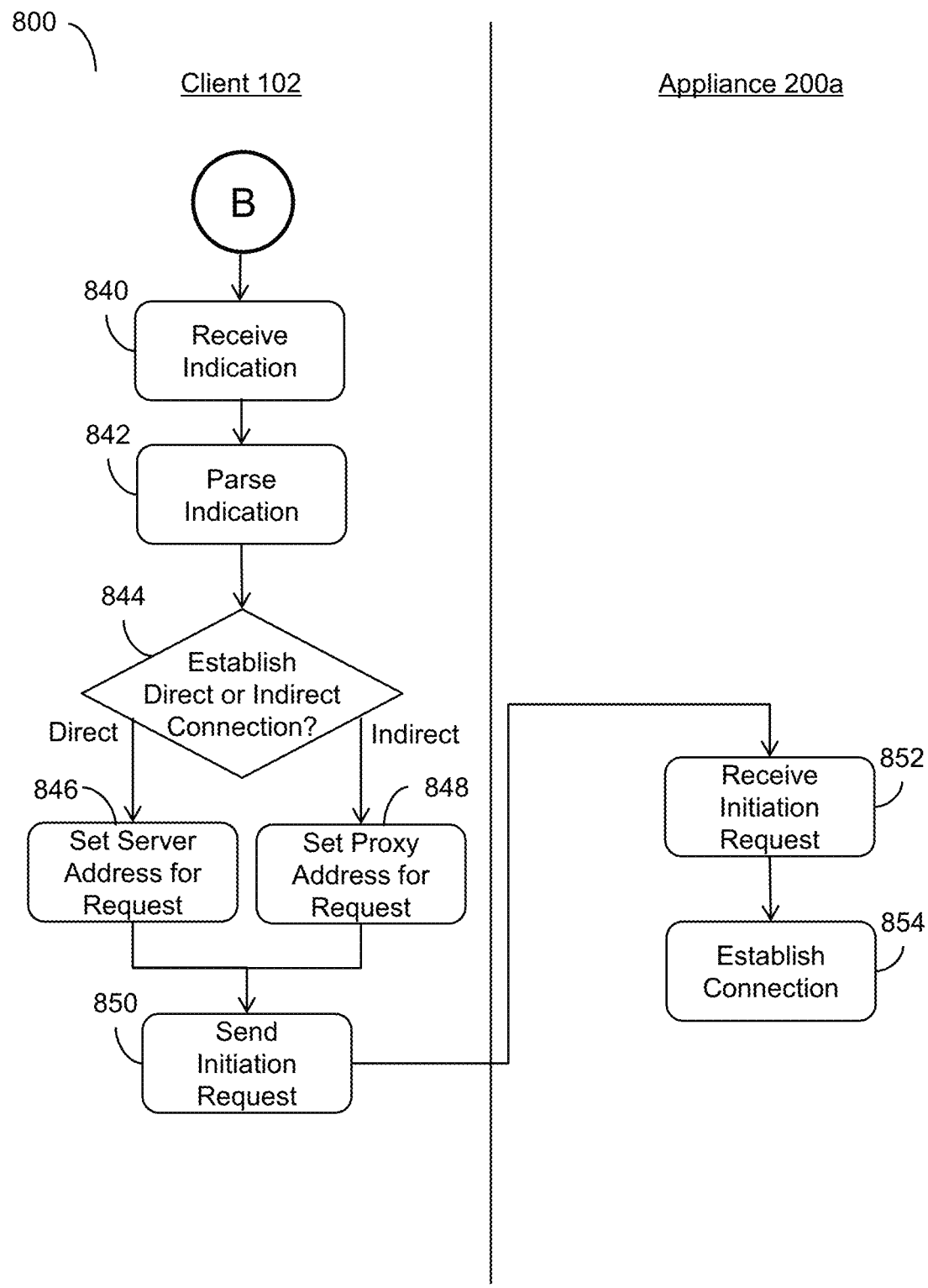

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

We claim:

1. A method of steering network traffic using dynamically generated configuration scripts, comprising:

generating, by a first device intermediary between a client and a second device, a configuration script for an application executing on the client for connecting the client with a server, the configuration script specifying the application to establish one of a direct connection with the server via the first device or an indirect connection with the server via the first device and the second device responsive to an access request to access resources on the server;

providing, by the first device to the client, the configuration script to be invoked by the application executing on the client to identify a first address to access the resources on the server based on a determination to establish one of the direct connection or the indirect connection with the server responsive to the access request;

receiving, by the first device from the client, an initiation request to connect with the server, the initiation request including the first address identified by the application in accordance with the configuration script;

determining, by the first device, a second address to connect with the server by applying a routing policy to the first address included in the initiation request received from the client, the routing policy used to modify addresses for accessing the resources on the server; and establishing, by the first device, one of the direct connection or the indirect connection between the client and the server using the second address determined by applying the routing policy to the first address included in the initiation request, the established direct connection or the indirect connection used to steer traffic between the client and the server.

2. The method of claim 1, wherein the first address includes an alias address for a plurality of second devices intermediary between the first device and the server to access the resources on the server; and wherein determining the second address further comprises:

selecting the second device from a plurality of second devices intermediary between the first device and the server by applying the routing policy to the alias address, the routing policy to select of one of the plurality of second devices for the alias address based on network path criteria; and identifying the second address referencing the second device selected from the plurality of second devices by applying the routing policy.

3. The method of claim 1, wherein the first address includes an alias address, the alias address including a first substring and a second substring, the first substring of the alias address corresponding a plurality of second devices intermediary between the first device and the server to access the resources on the server, the second substring of the alias address identifying service parameters to connect with the server; and wherein determining the second address further comprises:

identifying the service parameters from the first substring included in the alias address of the initiation request;

selecting the second device from the plurality of second devices by applying the routing policy to the second substring of the alias address, the routing policy to select of one of the plurality of second devices based on the service parameters identified from the first substring of the alias address; and identifying the second address referencing the second device selected from the plurality of second devices by applying the routing policy.

4. The method of claim 1, further comprising:

receiving, by the first device from the client, a domain name system (DNS) query encoded by the application in accordance with the configuration script, the DNS query including a service address for the server;

determining, by the first device, to establish one of the direct connection or the indirect connection by applying the routing policy to the service address;

selecting, by the first device, the first address from a plurality of network addresses based on the determination of establishing one of the direct connection or the indirect connection, the plurality of addresses including a first network address to establish the direct connection and a second network address to the indirect connection;

providing, by the first device to the client, a DNS response including the first address to establish one of the direct connection or the indirect connection between the client and the server; and wherein determining the second address further comprises using the first address as the second address to connect with the server in accordance with the routing policy.

5. The method of claim 1, further comprising:

receiving, by the first device from the client, a domain name system (DNS) query generated by the application in accordance with the configuration script, the DNS query including a service address for the server;

determining, by the first device, to establish the direct connection between the client and the server via the first device by applying the routing policy to the hostname in the DNS query; and providing, by the first device to the client, a DNS response with an indication to establish the direct connection to cause the application to initiate the direct connection by sending the initiation request including the first address specified by the configuration script for the direct connection with the server.

6. The method of claim 1, further comprising:

receiving, by the first device from the client, a domain name system (DNS) query generated by the application in accordance with the configuration script, the DNS query including a service address for the server;

determining, by the first device, to establish the indirect connection between the client and the server via the first device by applying the routing policy to the hostname in the DNS query; and providing, by the first device to the client, a DNS response with an indication to establish the indirect connection to cause the application to initiate the indirect connection by sending the initiation request including the first address specified by the configuration script for the indirect connection with the server via the second device.

7. The method of claim 1, further comprising:

receiving, by the first device from the client, a domain name system (DNS) query encoded by the application in accordance with the configuration script, the DNS query including a service address having an encoded hostname corresponding to the server; and finding, by the first device, a plurality of candidate network addresses from which to determine the first address for the server using the encoded hostname from the DNS query.

8. The method of claim 1, wherein the configuration script includes a first proxy autoconfig (PAC) file; and further comprising:

generating, by the first device, subsequent to generating the first PAC file, a second PAC file, the second PAC file specifying the application whether to establish the direct connection or the indirect connection with the server; and providing, by the first device to the client, the second PAC file to generate a third address to access the resources on the server on a second determination of whether to establish the direct connection or the indirect connection with the server responsive to a second access request, the third address different from the first address.

9. The method of claim 1, further comprising:

identifying, by the first device, a pre-generated configuration script from an external source, the pre-generated configuration script comprising a plurality of routing actions, each routing action specifying one of the direct connection or the indirect connection;

generating, by the first device, for a script generation policy, a plurality of templates using the pre-generated configuration script, each template corresponding to one of the plurality of routing actions;
wherein generating the configuration script further comprises generating the configuration script by selecting a template from the plurality of templates in accordance to the script generation policy based on at least one of an application profile for the application executing on the client, an account profile of a user on the application, and a network profile of the client.

10. The method of claim 1, wherein the configuration script generated for the client differs from a second configuration script generated for a second client.

11. A system for steering network traffic using dynamically generated configuration scripts, comprising:
a first device having one or more processors intermediary between a client and a second device, configured to:
generate a configuration script for an application executing on the client for connecting the client with a server, the configuration script specifying the application to establish one of a direct connection with the server via the first device or an indirect connection with the server via the first device and the second device responsive to an access request to access resources on the server;
provide the configuration script to be invoked by the application executing on the client to identify a first address to access the resources on the server based on a determination to establish one of the direct connection or the indirect connection with the server responsive to the access request;
receive, from the client, an initiation request to connect with the server, the initiation request including the first address identified by the application in accordance with the configuration script;
determine a second address to connect with the server by applying a routing policy to the first address included in the initiation request received from the client, the routing policy used to modify addresses for accessing the resources on the server; and
establish one of the direct connection or the indirect connection between the client and the server using the second address determined by applying the routing policy to the first address included in the initiation request, the established direct connection or the indirect connection used to steer traffic between the client and the server.

12. The system of claim 11, wherein the first address includes an alias address for a plurality of second devices intermediary between the first device and the server to access the resources on the server; and
wherein the first device is further configured to:
select the second device from a plurality of second devices intermediary between the first device and the server by applying the routing policy to the alias address, the routing policy to select of one of the plurality of second devices for the alias address based on network path criteria; and
identify the second address referencing the second device selected from the plurality of second devices by applying the routing policy.

13. The system of claim 11, wherein the first address includes an alias address, the alias address including a first substring and a second substring, the first substring of the alias address corresponding a plurality of second devices intermediary between the first device and the server to access the resources on the server, the second substring of the alias address identifying service parameters to connect with the server; and
wherein the first device is further configured to:
identify the service parameters from the first substring included in the alias address of the initiation request;
select the second device from the plurality of second devices by applying the routing policy to the second substring of the alias address, the routing policy to select of one of the plurality of second devices based on the service parameters identified from the first substring of the alias address; and
identify the second address referencing the second device selected from the plurality of second devices by applying the routing policy.

14. The system of claim 11, wherein the first device is further configured to:
receive, from the client, a domain name system (DNS) query encoded by the application in accordance with the configuration script, the DNS query including a service address for the server;
determine to establish one of the direct connection or the indirect connection by applying the routing policy to the service address;
select the first address from a plurality of network addresses based on the determination of establishing one of the direct connection or the indirect connection, the plurality of addresses including a first network address to establish the direct connection and a second network address to the indirect connection;
provide, to the client, a DNS response including the first address to establish one of the direct connection or the indirect connection between the client and the server; and
use the first address as the second address to connect with the server in accordance with the routing policy.

15. The system of claim 11, wherein the first device is further configured to:
receive, from the client, a domain name system (DNS) query generated by the application in accordance with the configuration script, the DNS query including a service address for the server;
determine to establish the direct connection between the client and the server via the first device by applying the routing policy to the hostname in the DNS query; and
provide, the client, a DNS response with an indication to establish the direct connection to cause the application to initiate the direct connection by sending the initiation request including the first address specified by the configuration script for the direct connection with the server.

16. The system of claim 11, wherein the first device is further configured to:
receive, from the client, a domain name system (DNS) query generated by the application in accordance with the configuration script, the DNS query including a service address for the server;
determine to establish the indirect connection between the client and the server via the first device by applying the routing policy to the hostname in the DNS query; and
provide, to the client, a DNS response with an indication to establish the indirect connection to cause the application to initiate the indirect connection by sending the initiation request including the first address specified by the configuration script for the indirect connection with the server via the second device.

17. The system of claim 11, wherein the first device is further configured to:
- receive, from the client, a domain name system (DNS) query encoded by the application in accordance with the configuration script, the DNS query including a service address having an encoded hostname corresponding to the server; and
- find a plurality of candidate network addresses from which to determine the first address for the server using the encoded hostname from the DNS query.

18. The system of claim 11, wherein the configuration script includes a first proxy autoconfig (PAC) file; and
wherein the first device is further configured to:
- generate, subsequent to generating the first PAC file, a second PAC file, the second PAC file specifying the application whether to establish the direct connection or the indirect connection with the server; and
- provide, to the client, the second PAC file to generate a third address to access the resources on the server on a second determination of whether to establish the direct connection or the indirect connection with the server responsive to a second access request, the third address different from the first address.

19. The system of claim 11, wherein the first device is further configured to:
- identify a pre-generated configuration script from an external source, the pre-generated configuration script comprising a plurality of routing actions, each routing action specifying one of the direct connection or the indirect connection;
- generate, for a script generation policy, a plurality of templates using the pre-generated configuration script, each template corresponding to one of the plurality of routing actions;
- generate the configuration script by selecting a template from the plurality of templates in accordance to the script generation policy based on at least one of an application profile for the application executing on the client, an account profile of a user on the application, and a network profile of the client.

20. The system of claim 11, wherein the configuration script generated for the client differs from a second configuration script generated for the second client.

* * * * *